US009405992B2

(12) United States Patent
Bådholm et al.

(10) Patent No.: US 9,405,992 B2
(45) Date of Patent: Aug. 2, 2016

(54) METHOD AND SYSTEM FOR IDENTIFYING WASTE CONTAINERS BASED ON PATTERN

(75) Inventors: Sven Bådholm, Saltsjö-Boo (SE); Christian Toräng, Linköping (SE); Stefan Holmertz, Vadstena (SE)

(73) Assignee: Envac Optibag AB, Mjölby (SE)

( * ) Notice: Subject to any disclaimer, the term of this patent is extended or adjusted under 35 U.S.C. 154(b) by 0 days.

(21) Appl. No.: 14/009,017

(22) PCT Filed: Mar. 30, 2012

(86) PCT No.: PCT/SE2012/050353

§ 371 (c)(1), (2), (4) Date: Nov. 5, 2013

(87) PCT Pub. No.: WO2012/134389

PCT Pub. Date: Oct. 4, 2012

(65) Prior Publication Data

US 2014/0050397 A1 Feb. 20, 2014

Related U.S. Application Data

(60) Provisional application No. 61/470,553, filed on Apr. 1, 2011.

(30) Foreign Application Priority Data

Apr. 1, 2011 (NO) .................................... 20110508
Apr. 1, 2011 (SE) ...................................... 1150288

(51) Int. Cl.
*G06K 9/00* (2006.01)
*G06K 9/46* (2006.01)
*B07C 5/34* (2006.01)

(52) U.S. Cl.
CPC ............ *G06K 9/4652* (2013.01); *B07C 5/3412* (2013.01)

(58) Field of Classification Search
None
See application file for complete search history.

(56) References Cited

U.S. PATENT DOCUMENTS 4,745,269 A 5/1988 Van Gils
5,100,005 A 3/1992 Noble et al.

(Continued)

FOREIGN PATENT DOCUMENTS

DE 4330815 A1 3/1995
EP 0158361 A2 10/1985

(Continued)

OTHER PUBLICATIONS

Envac Optibag AB et al., International Application No. PCT/SE2012/050353, International Preliminary Report on Patentability, Oct. 1, 2013.

(Continued)

*Primary Examiner* — Feng Niu
(74) *Attorney, Agent, or Firm* — Michael G. Johnston; Moore & Van Allen PLLC

(57) ABSTRACT

There is provided a method for identifying and sorting randomly distributed waste containers (1) containing different types of refuse sorted at source, wherein the identification is based on an image analysis of a pattern (2) arranged on each container (1). The method for identifying and sorting comprises the following steps: capturing at least one image of each container (1), analyzing the image by determining following characteristics: a shade and/or color of the pattern; a type of the pattern arranged on the container; calculating a sorting value based on the determined characteristics; comparing the calculated sorting value to a predetermined limit value or predetermined range of sorting values in order to classify the type of refuse contained in the container for sorting thereof.

16 Claims, 4 Drawing Sheets

(56) References Cited

U.S. PATENT DOCUMENTS

| | | | | |
|---|---|---|---|---|
| 5,299,693 | A | 4/1994 | Ubaldi et al. | |
| 2008/0190953 | A1* | 8/2008 | Mallett et al. | 221/13 |
| 2011/0238598 | A1* | 9/2011 | Borowski et al. | 705/500 |

FOREIGN PATENT DOCUMENTS

| | | | |
|---|---|---|---|
| EP | 0656233 | A2 | 6/1995 |
| EP | 0759816 | B1 | 1/2000 |
| SE | 8901046 | A | 9/1990 |
| SE | 467394 | B | 7/1992 |
| WO | 9011142 | | 10/1990 |
| WO | 9306945 | A1 | 4/1993 |
| WO | 9532062 | A1 | 11/1995 |
| WO | 9622512 | A1 | 7/1996 |
| WO | 03041014 | A1 | 5/2003 |
| WO | 2004050264 | A1 | 6/2004 |

OTHER PUBLICATIONS

Envac Optibag AB et al., International Application No. PCT/SE2012/050353, International Search Report and Written Opinion, Jun. 28, 2012.

* cited by examiner

METHOD AND SYSTEM FOR IDENTIFYING WASTE CONTAINERS BASED ON PATTERN

TECHNICAL FIELD

The present document relates to a method for identifying and sorting waste containers provided with a pattern. The document also relates to an arrangement for sorting waste containers according to the method.

BACKGROUND

In recent years an automated sorting of domestic waste, sorted at source, into different fractions has become more and more important in order to increase the efficiency of the waste handling facilities and in order to be able to take care of the ever growing amounts of waste produced by the households.

There are a number of different methods and systems available today to perform this type of sorting. WO95/32062 discloses an arrangement for sorting differently coloured waste sacks which occur in random distributions and contain different types of waste sorted at source. This arrangement comprises sorting stations, which by means of a colour analysis as disclosed in WO9622512 identify and then separate waste sacks of a predetermined color, which are conveyed on a conveyor belt.

In EP 1 583 618 the refuse sacks are provided with a means of identification, in this case the entire bag is provided with a specific colour, and the sorting is performed at least one sorting station, which is able to identify at least two means of identification, this method and arrangement thus further enhances the accuracy of the sorting.

As the amounts of domestic waste continues to increase there is a need for efficient sorting, and also a sorting that can take into account the wish that it should be possible to make use of the different fractions of the waste, for instance in biogas production of organic waste. The demands for specificity in the sorting for this type of waste are high, as plastics and other unwanted materials can clog the production of biogas and even in a worst case scenario render the entire biogas facility unuseable.

Sorting waste in bags having different colours is advantageous in that it is pedagogic, i.e. the user can easily decide which bag to use for a particular type of waste, and that all the waste bags may be placed in one and the same waste container, which makes it easy when the waste is to be collected. One problem with having coloured bags is however that waste sorting can be tedious and if the bag is coloured the user may experience a sense that it doesn't matter if he puts something in the wrong bag, or if he does not sort the waste at all. There is thus a need for a solution in which the user can easily see what the bag is supposed to contain and the personnel at the waste handling facility may visually inspect to see that nothing has been wrongfully placed in the bag. One way of solving this problem is to make a transparent bag. It must however still be possible for the user to determine what type of waste he bag is meant to be filled and to sort the bag in a convenient and most of all accurate manner at the waste handling facility.

SUMMARY

It is an object of the present disclosure, to provide an improved method and arrangement for sorting waste bags, which eliminates or alleviates at least some of the disadvantages of the prior art and which allows for an improved sorting quality, especially in sorting of domestic waste.

The invention is defined by the appended independent claims. Embodiments are set forth in the appended dependent claims and in the following description and drawings.

According to a first aspect, there is provided a method for identifying and sorting randomly distributed waste containers containing different types of refuse sorted at source, wherein the identification is based on an image analysis of a pattern arranged on each container. The method for identifying and sorting comprises the following steps: capturing at least one image of each container, analyzing the image by determining following characteristics: a shade and/or color of the pattern; a type of the pattern arranged on the container; and calculating a sorting value based on the determined characteristics. The calculated sorting value is compared to a predetermined limit value or predetermined range of sorting values in order to classify the type of refuse contained in the container for sorting thereof. The "type of pattern" may be determined by assigning a shape factor to the pattern. By "shape factor" is meant that if the pattern is in the predetermined form of a dot the shape factor 1 would represent a perfect circle and an ellipse would for instance represent the shape factor 0.6.

This means that each bag is assigned a "sorting value" by the analysis, i.e. a number calculated from determining the different characteristics of the pattern on the bag, which is compared to a predetermined limit value or a predetermined range of sorting values and which sorting value is decisive for determining what the contents of the container such that it can subsequently be sorted into a correct vessel in the waste sorting facility.

Since the bags are classified according to both color and/or shade and the shape or type of pattern there is provided a sorting and identification method which is able to, with a great certainty and precision, classify and sort the containers correctly. This sorting method is much safer and more precise than prior art sorting methods based on e.g. the color of the container only.

Even further the method allows for the use of a transparent container or bag, in which material sorted therein could have the same color or being the same type of pattern as the pattern printed on the bag as the identification of the bag is dependent on the integer of several characteristics and not only the color of the pattern.

Further as the transparent container allows for a visual inspection of the refuse contained therein, the sorting can be supervised by e.g. waste facility personnel which allows for the sorting to be even more accurate. The use of transparent containers may also reduce the tendency of the user to cheat when sorting the waste at source.

The color of the pattern can be used for the identification of what the bag is intended to be filled with by the consumer. This means that a green pattern may be used for organic waste, a red pattern may be used for paper material, a black pattern may be used for plastics material etc. The color or shade may also simply be black, and the other characteristics of the pattern may then be decisive for the type of container.

This method allows for the identification of a container, such as a plastic bag, filled with material, where the pattern at some portions thereof may have been stretched out, or even lost. That means that the bag can be identified and sorted independently from outer phenomena and objects contained in the bag. By outer phenomena is meant for instance that a container or bag from a specific store may have a color, or even a print that could confuse the sorting. This method may allow for such disturbances of the sorting to be reduced as a bag not presenting all the characteristics needed for the analysis, or a bag presenting characteristics which do not comply with the predetermined limit value or range of sorting values of the sorting value calculated in the analysis, will be classified as "other waste" and can be properly handled by the waste handling system as such.

By capturing at least one image, usually at least 10 images of the same container as it passes by the sensor or camera, and comparing the image analysis of each of these images an even more precise identification may be achieved, the pattern or object may thus be analyzed from several different angles and images.

According to the first aspect the pattern may comprise at least one well-defined object.

This means that the identification is based on identifying that one point, that could be a dot, a square, a triangle, a line, a bent line, a curved line etc. and determining its color, and the type of pattern thereof.

According to one alternative of the first aspect the pattern may comprise a plurality of well-defined objects, wherein the objects form a cluster.

According to the first aspect the method may further comprise analyzing the image by determining the following characteristics: the number of objects within the cluster; distances between the objects of the cluster; and a size of each individual object.

By "distances between the objects" is meant that the distances between the points within the cluster are measured in a predetermined manner and thus a mutual relationship between the points can be determined.

The analysis based on a plurality of objects in a cluster may even further increase the specificity of the identification as it is possible to provide the bag with a very specific pattern which cannot easily be confused with or mistaken for some other type of print or contents of the bag, that could lead to an incorrect identification.

The method allows for the use of a transparent bag, in which material sorted therein could have the same color as the pattern printed on the bag as the identification of the bag is dependent on the total sum of several characteristics and not only the color of the pattern.

Further as the transparent container allows for a visual inspection of the refuse contained therein, the sorting can be supervised by e.g. waste facility personnel which allows for the sorting to be even more accurate.

The cluster may be arranged in the shape of a logo, a letter, or a number. The pattern could thus be arranged as a further guidance to the consumer in that the container could be marked with a pattern forming the letters for what is intended to be in the container. The cluster may also form the shape of a dot, a square, a triangle, a line, a bent line, a curved line etc. and the determination of the "type of pattern" in this case may be by determining this shape, or by assigning a shape factor to this cluster of objects forming a particular shape.

It is further conceivable that instead of having different colors on the bag the pattern cluster could be identified by the logo, letters or number which the cluster forms.

That means that the letter "P" could for instance be arranged as the identifiable pattern, but also as an indication to the consumer that the container is to be filled with e.g. paper. The "P" could thus also comprise a plurality of objects.

According to yet an alternative the method may further comprise analyzing the image by determining the following characteristic: a surface area of the pattern.

By "surface area of the pattern" is meant the total surface area of the pattern, which also takes into account the area and space between the objects, as well as the surface area of the individual objects.

By determining a surface area of the pattern and comparing this to a predetermined surface area it is even further possible to discriminate between the desired pattern for sorting and some other type of pattern printed on the bag.

According to a second aspect there is provided a method for identifying and sorting randomly distributed waste containers containing different types of refuse sorted at source, wherein the identification is based on an image analysis of a pattern, wherein the pattern comprises at least one well-defined object. The method for identifying and sorting comprises the following steps: capturing at least one image of each container, and analyzing the image by determining following characteristics: a shade and/or color of the object; a size of the individual object; and a surface area of the pattern;

A sorting value is calculated based on the determined characteristics and compared to a predetermined limit value or predetermined range of sorting values in order to classify the type of refuse contained in the container for sorting thereof.

By "surface area of the pattern" is meant the total surface area, i.e.

both the area of the object and the space around or between the objects.

By "size of object" is meant the area of the individual object or objects.

This means that each bag is assigned a "sorting value" by the analysis, i.e. a number calculated from determining the different characteristics of the pattern on the bag, which is compared to a predetermined limit value or a predetermined range of sorting values and which sorting value is decisive for determining what the contents of the container such that it can subsequently be sorted into a correct vessel in the waste sorting facility.

Since the bags are classified according to both color and/or shade and the size of the individual object or objects and the surface area of the pattern, there is provided a sorting and identification method which is able to, with a great certainty and precision, classify and sort the containers correctly. This sorting method is much safer and more precise than prior art sorting methods based on e.g. the color of the container only.

Even further the method allows for the use of a transparent container or bag, in which material sorted therein could have the same color or being the same type of pattern as the pattern printed on the bag as the identification of the bag is dependent on the integer of several characteristics and not only the color of the pattern.

Further as the transparent container allows for a visual inspection of the refuse contained therein, the sorting can be supervised by e.g. waste facility personnel which allows for the sorting to be even more accurate. The use of transparent containers may also reduce the tendency of the user to cheat when sorting the waste at source.

The color of the pattern can be used for the identification of what the bag is intended to be filled with by the consumer. This means that a green pattern may be used for organic waste, a red pattern may be used for paper material, a black pattern may be used for plastics material etc. The color may also simply be black, and the other characteristics of the pattern may then be decisive for the type of container.

This method allows for the identification of a container, such as a plastic bag, filled with material, where the pattern at some portions thereof may have been stretched out, or even lost. That means that the bag can be identified and sorted independently from outer phenomena and objects contained in the bag. By outer phenomena is meant for instance that a container or bag from a specific store may have a color, or even a print that could confuse the sorting. This method may allow for such disturbances of the sorting to be reduced as a bag not presenting all the characteristics needed for the analysis, or a bag presenting characteristics which do not comply with the predetermined limit value or range of sorting values of the sorting value calculated in the analysis, will be classified as "other waste" and can be properly handled by the waste handling system as such.

By capturing at least one image, usually at least 10 images of the same container as it passes by the sensor or camera, and comparing the image analysis of each of these images an even more precise identification may be achieved, the pattern or object may thus be analyzed from several different angles and images.

According to the second aspect the pattern may comprise a plurality of well-defined objects, wherein the objects form a cluster arranged on each container. The method according to the second aspect may further comprise determining the following characteristic: the distances between the objects and even further a type of the pattern arranged on the container.

By "distances between the objects" is meant that the distances between the points within the cluster are measured in a predetermined manner and thus a mutual relationship between the points can be determined.

The "type of pattern" may be determined by assigning a shape factor to the pattern. By "shape factor" is meant that if the pattern is in the predetermined form of a dot the shape factor 1 would represent a perfect circle and an ellipse would for instance represent the shape factor 0,6.

The "type of pattern" may also be determined by other means, such as the diameter or the circumference of the pattern.

The analysis based on a plurality of objects in a cluster may even further increase the specificity of the identification as it is possible to provide the bag with a very specific pattern which cannot easily be confused with or mistaken for some other type of print or contents of the bag, that could lead to an incorrect identification.

The method allows for the use of a transparent bag, in which material sorted therein could have the same color as the pattern printed on the bag as the identification of the bag is dependent on the total sum of several characteristics and not only the color of the pattern.

Further as the transparent container allows for a visual inspection of the refuse contained therein, the sorting can be supervised by e.g. waste facility personnel which allows for the sorting to be even more accurate.

The container may be provided with a color, and wherein the color of the container is different from the color of the pattern.

According to one embodiment the pattern may be arranged on at least one well-defined portion of the container.

The pattern may, according to yet an alternative, be arranged on a plurality of locations on the container.

By arranging the pattern on more than one portion of the bag, i.e. spread out over the bag it is possible to provide an even more accurate identification and sorting, as the likelihood of there being a "perfect" pattern somewhere on the container or bag is increased. The pattern may also be arranged to cover substantially the entire container or bag.

In order to allow for the visual inspection of the container it could however be appropriate that these plurality of locations are arranged to allow or seeing through the bag.

The pattern may comprise two or more different colors.

By having a pattern that comprises two or more colors the identification may be even further improved.

The waste container may essentially consist of a thin-walled bag of flexible material.

The container may thus be essentially a plastics bag provided with a pattern.

According to a third aspect there is provided an arrangement for sorting a plurality of waste containers designed to receive a quantity of waste, and wherein the containers are provided with at least one well-defined pattern. The arrangement comprises a conveyor arranged to transport the waste containers, at least one first sensor arranged for analysing a pattern arranged on a container, arranged to emit a signal when a waste container transported on the conveyor is recorded by said at least one first sensor, and means for sorting the waste containers based on the signal from the first sensor. The first sensor is arranged analyze the pattern arranged on the waste containers according to the first or second aspect.

According to one alternative of the third aspect the arrangement may further comprise at least one second sensor for analyzing a pattern of a waste container according to the first aspect, and for emitting a second signal in response to the second sensor recording the pattern on the waste container provided with said pattern transported on the conveyor, wherein the pattern analysed by the second sensor may be the same or different as the pattern analysed by the first sensor and wherein said sorting means are arranged to sort the waste containers based also on said second signal.

According to a fourth aspect there is provided an arrangement for the sorting of waste containers comprising a transporting arrangement designed to transport randomly distributed waste containers containing different types of waste sorted at source, each waste container having a predetermined pattern for the type of waste in the container, a number of successively arranged sorting stations each comprising at least one sensor selectively sensitive to the respective patterns and designed to emit a signal when a waste container passes which has a pattern predetermined for the sensor and to which the sensor is sensitive, and separating elements designed, in response to a signal from the sensor, to undertake separation of the waste container in question from the transporting arrangement, wherein at least one sensing arrangement is sensitive to at least one further predetermined pattern on waste containers containing another type of waste. The sensors are arranged to analyze the pattern provided on the containers based on the method as according to the first or second aspect.

By having at least one sensor it is further possible to adapt the sorting stations to detect not only a pattern but also a color of the container at the same sorting station as a double detection system for each sorting station. It is of course also conceivable that a single sensor is able to detect and analyze not only the pattern arranged on the container but also the color or shade of the entire container.

According to one alternative of the third and fourth aspect the sensor may be an optical camera for capturing at least one image of each waste container passing by the sensor. The sensor may also be some type of scanner arranged to analyse the at least one image captured of the container.

According to yet an alternative of the third and fourth aspect the arrangement may further comprise an auxiliary sensor arranged to detect an object conveyed on the conveyor.

By auxiliary sensor is thus meant a sensor, such as e.g. a photocell, that may further improve the accuracy of the sorting, in that a signal may be sent to the sorting station that an object is actually present on the conveyer of which an image should be captured. By using this auxiliary sensor errors due to e.g. empty bags or other flat materials on the conveyor belt, of which the first sensor would otherwise capture an image and possibly submit a signal to the sorting station to remove the object from the conveyor, when there is actually nothing to remove, may be reduced or all together avoided.

BRIEF DESCRIPTION OF THE DRAWINGS

Embodiments of the present solution will now be described, by way of example, with reference to the accompanying schematic drawings.

DESCRIPTION OF EMBODIMENTS

Figure 1A:
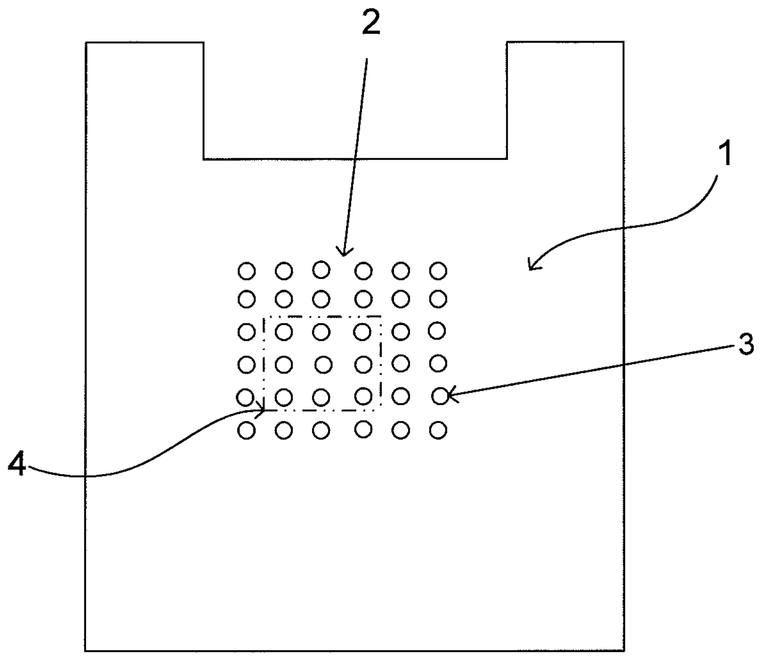
FIGS. 1*a*-1*d* are a schematic top views of a flattened out containers provided with different embodiments of patterns.
Figure 1B:
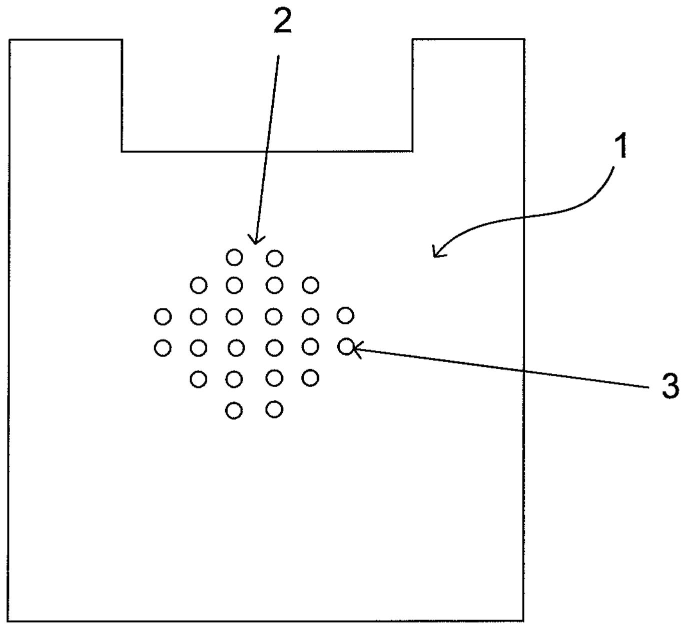
Figure 1C:
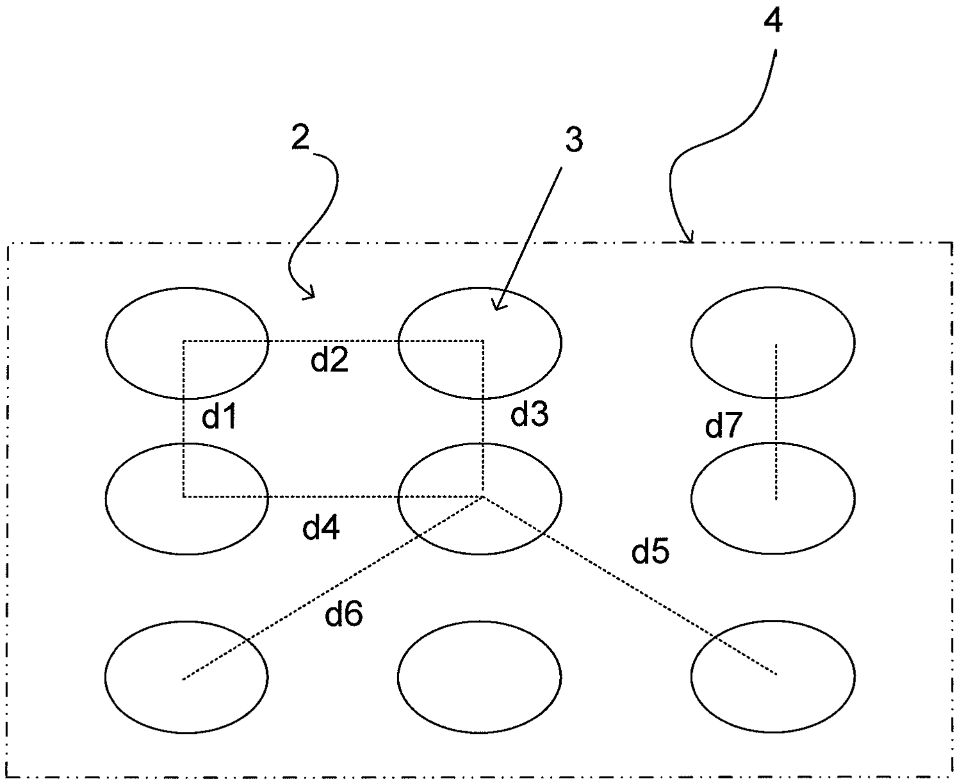

FIGS. 1*a-c* shows a flatted out waste container 1, which may consist of a thin-walled bag 1 of a flexible material, such as plastic, paper, metal or a combination thereof. The bag 1 can have a closure to prevent waste in the bag from being spread outside the bag. The bag or container is provided with, in the flattened out state, a well-defined pattern 2.

In the below the word container and bag will be used interchangingly, however the term "container" may not to be interpreted to being limited to a plastic bag only.

The bag may be transparent, but according to one alternative it may also be provided with a color or a shade, which may still allow for the bag to be transparent, i.e. have a low opacity in the visible light spectra. The color or shade of the bag may in this alternative embodiment be the same or different as the color of the pattern.

The determination of the shade and/or color may be performed by determining the hue, saturation and intensity and comparing these obtained sorting values with a predetermined value or a predetermined range of value, i.e. maximum and minimum values. This determination may further be performed by other techniques such as RGB determination etc. known to the skilled person.

According to yet an alternative the container may be completely colored, i.e. does not allow to be seen through, and according to this embodiment the color or shade of the bag is different from the color or shade of the pattern. The color of the bag can according to this embodiment be a further way to analyse and identify the bag.

According to another alternative the bag may be completely colored and the pattern is arranged as transparent portions.

The pattern may have a color that predeterminingly corresponds, e.g. as an information to the user, to the type of waste to be placed in the container. Alternatively the color or shade of the pattern for all types of waste is the same, according to such an embodiment it is to be understood that the pattern instead has a shape that corresponds to the type of waste to be placed in the container. This means that the pattern may be e.g. black but that a dot or circle represents for instance organic waste, a triangle paper waste etc.

Figure 1D:
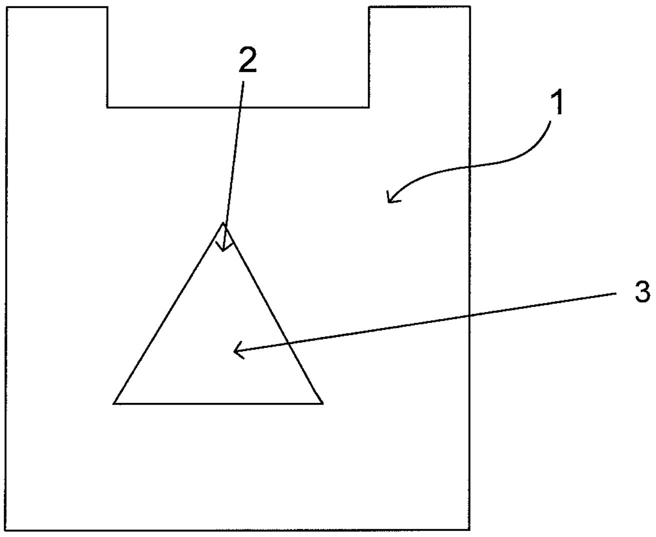

The pattern may be one object 2, such as a triangle, dot or square arranged on a well-defined portion of the bag (se FIG. 1*d*).

The pattern may further be a plurality of objects 3 in a cluster, arranged on at least one portion of the container (FIG. 1*b*). According to one embodiment the pattern or cluster of objects cover substantially the entire container (not shown). The objects or pattern may be arranged on both sides of the container.

According to one alternative the container formed from a blank comprising a circumferential tube, e.g. a thin-walled polymer tube, which tube is provided with the pattern before the container or plastic bag is formed. The container or bag may thus be formed from a polymer tube segment, preferably of a plastics material, and when unfilled the container has an essentially two-dimensional extension, which is shown in the figures. By container is thus meant an item in which objects, in this case different types of waste, e.g. paper, organic waste, plastic containers, etc., may be stored or kept, which is closed at a proximal end and which is provided with sealing means at an open distal end. The sealing means may be handles of a plastics bag, or a string that is tied around the open distal end, or any other means suitable for closing the bag properly before sorting.

According to yet an alternative the container is in the form of a plastics bag which is formed without a folded portion along the sides, and thus the pattern may be arranged on the bag such that virtually the entire bag is covered with the pattern. The pattern is preferably arranged such that it allows for a visual inspection of the contents of the bag.

As such the object or objects may together as a cluster or individually have the shape of a circle, a dot (i.e. a filled circle), a square, a triangle, an oval or any other type of shape (see e.g. FIG. 1*b*). The pattern itself may thus be a guide to the user regarding what to put in the container, e.g. a circle may be biodegradable waste, a triangle may be metal waste, and an unspecified pattern may thus mean that the bag cannot be classified.

According to the method of the present disclosure the pattern 2 is analysed by image analysis. A sensor, such as an optical camera may capture at least one image of the container as it passes by the sensor and a determination of several characteristics of the pattern may be performed.

The sensor may also be some type of scanner, that provides a scanned image for the analysis.

The camera may be a digital or analogue camera, providing a computer with the at least one image.

Based on these different characteristics a sorting value for the pattern provided on the container is calculated, either as a total or for each of the individual characteristics. This calculated or obtained sorting value or values may then be compared to a predetermined sorting value or a predetermined range of sorting values to determine if the pattern, and thus the container, is the desired pattern or container for that sensor or sorting station. The calculated or obtained sorting value is thus a function of the characteristics determined by the analysis. Each of these characteristics may be compared with predetermined values which enables a classification of the pattern.

According to one embodiment the different characteristics, i.e. the calculated or obtained sorting values of the different characteristics, may be compared to the predetermined sorting values one by one, for instance in a stepwise manner. The order in which the different characteristics are determined may be set arbitrarily, but preferably the shade and/or color is determined firstly.

This means that if the shade and/or color corresponds to a predetermined color and/or shade for the particular sorting station through which it passes the method of identifying and sorting the containers goes on to an analysis of other characteristics of the pattern.

The characteristics that are determined and analysed comprises, the shade and/or color of the pattern itself, the type of the pattern arranged on the container, which may be determined by assigning a shape factor to the pattern.

According to one embodiment, if the object is a dot, the shape factor 1would represent a perfect circle and an ellipse would for instance represent the shape factor 0.6. This also applies to a pattern comprising a plurality of objects arranged in a cluster, where the individual object in the cluster may be assigned a shape factor, but also the entire pattern or cluster of objects, i.e. if the cluster of objects e.g. forms a triangle, or a dot etc. this shape may be assigned a shape factor.

The "type of pattern" may also be characterized and determined by other types of analysis which are readily conceivable by the skilled person.

The type of pattern may thus be analysed by determining the shape of the pattern in many different ways and is not limited only to the what is described herein. The shape may for instance be determined by the diameter, circumference etc. of the individual object or of the cluster of objects.

According to another embodiment the characteristics that are determined and analysed comprises the shade and/or color of the pattern, the size of each individual object and a surface area of the pattern.

According to alternative embodiments further characteristics that may be determined by the image analysis are the number of objects 3 within the cluster, and the size of each individual object 3.

The predetermined sorting value for the size of each individual object 3 may be defined as an interval or as a definite value. By interval is thus meant that the a predetermined range (minimum and maximum value) is set. By the size of each object is meant the area or surface area of each individual object. The total sum of all areas of the objects within the pattern or cluster may also be determined as a total surface area of the objects (as opposed to the term total surface area of the pattern, which also takes into account the area and space between the objects). The method can thus take into account certain deviations for certain objects in the cluster and still be able to determine if the analyzed pattern is the desired or correct pattern or not.

In FIG. 1*c* a detail 4 of the bag shown in FIG. 1*a,* and the measurements of distances d1-7 between different objects in the cluster, which is also one characteristic that may be determined by the image analysis.

The distances may be e.g. measured from the centre of one object to the centre of an adjacent object in an X-Y coordinate system, where the principal point of each object is the centre of the object. FIG. 1*c* illustrates different types of distances that can be measured. It is also possible to measure other distances not shown in the figures. That means that if one portion of the objects are arranged as forming parts of the corners of a square the distances between the objects are measured in a number of different ways and compared to the predetermined limit value or range (max/min) of distances.

The distances may thus be measured in a precise manner to take into account for when the pattern, or cluster of objects, have been stretched out or even destroyed at a portion of the total surface area of the pattern.

According to yet an alternative the surface area of the pattern is also determined. By total surface area of the pattern is thus meant the entire surface area covering both the objects and the space in between the objects.

A predetermined area is thus set for analyzing the container, this area may be set within a minimum-maximum range, and the calculated or obtained surface area of the pattern may thus be compared to this predetermined range, i.e. if the detected or obtained total surface area of the pattern falls within the predetermined range (min/max value of the area) it is sorted as the desired fraction or container.

There are thus three different type of areas or sizes that may be analyzed, these are:

- the size of each object, i.e. the surface area of each individual object, e.g. a so called "spot area"
- the total surface area of the objects, i.e. the sum of all individual object areas ("spot areas")
- the total surface area; i.e. the total surface area of the pattern, which is the area of the individual objects and the space between the objects When the pattern comprises a plurality of objects, the method may comprise setting an area (e.g. looking at the pattern within a circle having a specific diameter), for which the total surface area is to be determined, i.e. calculating the individual object areas (sizes) and the space between the objects within a preset area, and comparing the calculated or obtained area within the encircled area with a predetermined max-min range.

This means that a circle, "preset area" may be formed around the objects having a correct color and/or shade, and e.g. a correct size and corrects distances between the objects and that the total surface area (objects and space between) may be calculated within this circle and compared to a predetermined range of min max values This allows for a correct identification and sorting of container which consists of a thin walled bag of flexible material, which when filled with waste material, does not present the essentially two-dimensional extension than an unfilled bag, or even a container which is made from a more rigid material, would.

Even further a container, such a plastics bag, which has been provided with the pattern before the formation of the actual container, would have the advantage that it is provided with a pattern not only on the front and back side of the bag, but also in the case the bag comprises folded portions on these as well, and would thus, when the bag is filled with material, i.e. when the bag is expanded, also present the pattern on these portions of the bag which are normally not printed or provided with a pattern.

This means that if the pattern does not cover the predetermined surface area, i.e. calculated or obtained total surface area is not within the predetermined min-max range, the container may be sorted as "other waste" or as one of the desired fractions depending on the sorting value calculated from the other characteristics as well. Through the present method it should thus still be possible to correctly sort the container even though the pattern for some reason is not visible on the entire surface area as it should be, e.g. hidden behind something that is stuck on the container or it has been disrupted or destroyed.

It could also be that a container could be provided with a pattern similar to the desired pattern, but which covers more or less of the bag than the predetermined surface area of the desired and correct pattern does, the sorting method should then provide for a determination that the container does not comprise the correct pattern and thus sort the container as "other waste". This is even further facilitated by the fact that several images, of the same container, may be compared with each other in the analysis.

The pattern may be analysed by the aid of sensors such as optical cameras connected to computers, and the method and analysis may thus be fully automated. The optical camera may be an analogue or digital camera, which may respectively be connected to the sorting station, by any conventional means known to the skilled person.

Figure 2:
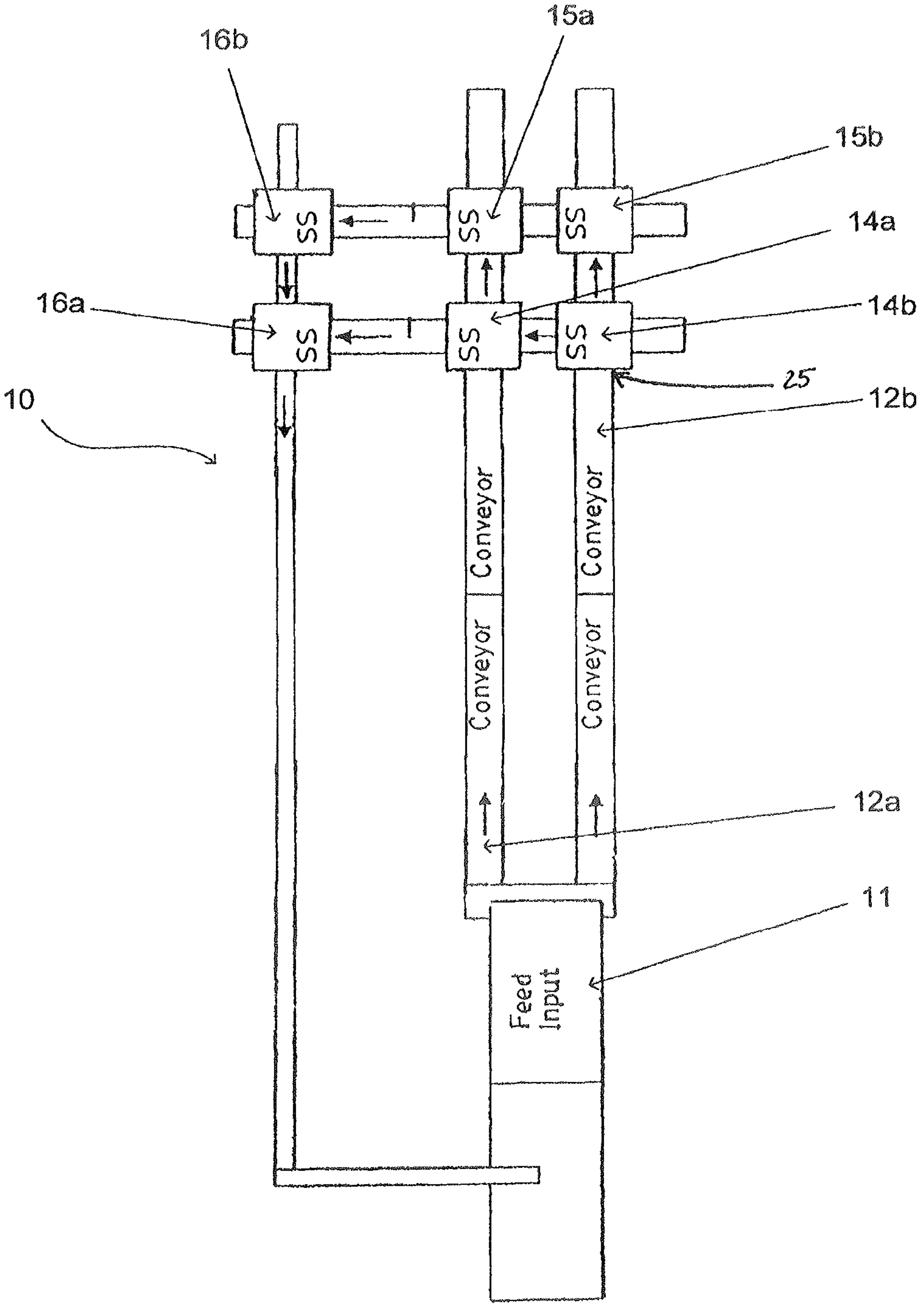
FIG. 2 is a schematic plan view from above showing one embodiment of an arrangement for sorting waste containers.

FIG. 2 is a simplified view of a sorting arrangement 10 for waste containers 1. The sorting arrangement comprises a feed input 11, which may be a conveyor belt, or a chute from which waste containers 1 to be sorted is transported. The feed input conveyor transports the containers to a second conveyor 12. In FIG. 2 two parallel conveyor belts 12*a,* 12*b* lead to a series of sorting stations. A first sorting station 14*a,* 14*b* is provided with a sensor arranged for analyzing a pattern 2 provided on the waste containers 1 according to the above described method. Based on the analysis the sorting station provides a signal when the correct pattern is identified which allows for a sorting means (not shown) to remove the container, provided with the detected pattern, from the conveyor belt into some type of vessel for storing the waste containers. In the arrangement 10 shown in FIG. 2 the waste containers pass three different sorting stations 14*a*, 15*a*, 16*a*, which may be arranged to detect the same or different type of patterns. The sorting station may also be provided with sensors that allow for an identification of several types of patterns and sort those bags into one or more vessels. This means that the arrangement allows for the sorting of containers each provided with different patterns.

The waste container can also pass a sorting station provided with a sensor of the type which is disclosed in SE8901046-6, W09306945A1 and EP0759816B1 and which identifies a colour or a shade of the passing waste container, a second signal representing said colour or shade being sent to the control unit. The sensors can be arranged in any relative order. Thus it need not be important which sensor records the waste container 1 first.

Sorting means (not shown) are arranged to selectively strike or push a waste container 1 away from the conveyor belt 12*a*, 12*b*, so that the waste container gets into a collecting vessel (not shown). The control unit can be arranged to produce control signals to the sorting means based on the time of arrival of the signals from the sensors of the sorting stations 14*a*, 14*b*, 15*a*, 15*b* and knowledge of the transport speed of the conveyor. This results in sorting of the waste container in collecting vessels, which, for example, can be intended to contain biodegradable and combustible waste respectively. It will be appreciated that the sorting arrangement, the conveyor and the sorting means can be designed in various ways. Conveyors of different types can be used, such as belt conveyors, screw conveyors, overhead conveyors, chain conveyors etc. Also pipes in which the waste containers are made to be transported under the action of excess pressure, negative pressure and/or gravity may constitute conveyors. Also the number of collecting vessels can be varied according to the number of sorting fractions that are desired.

Figure 3:
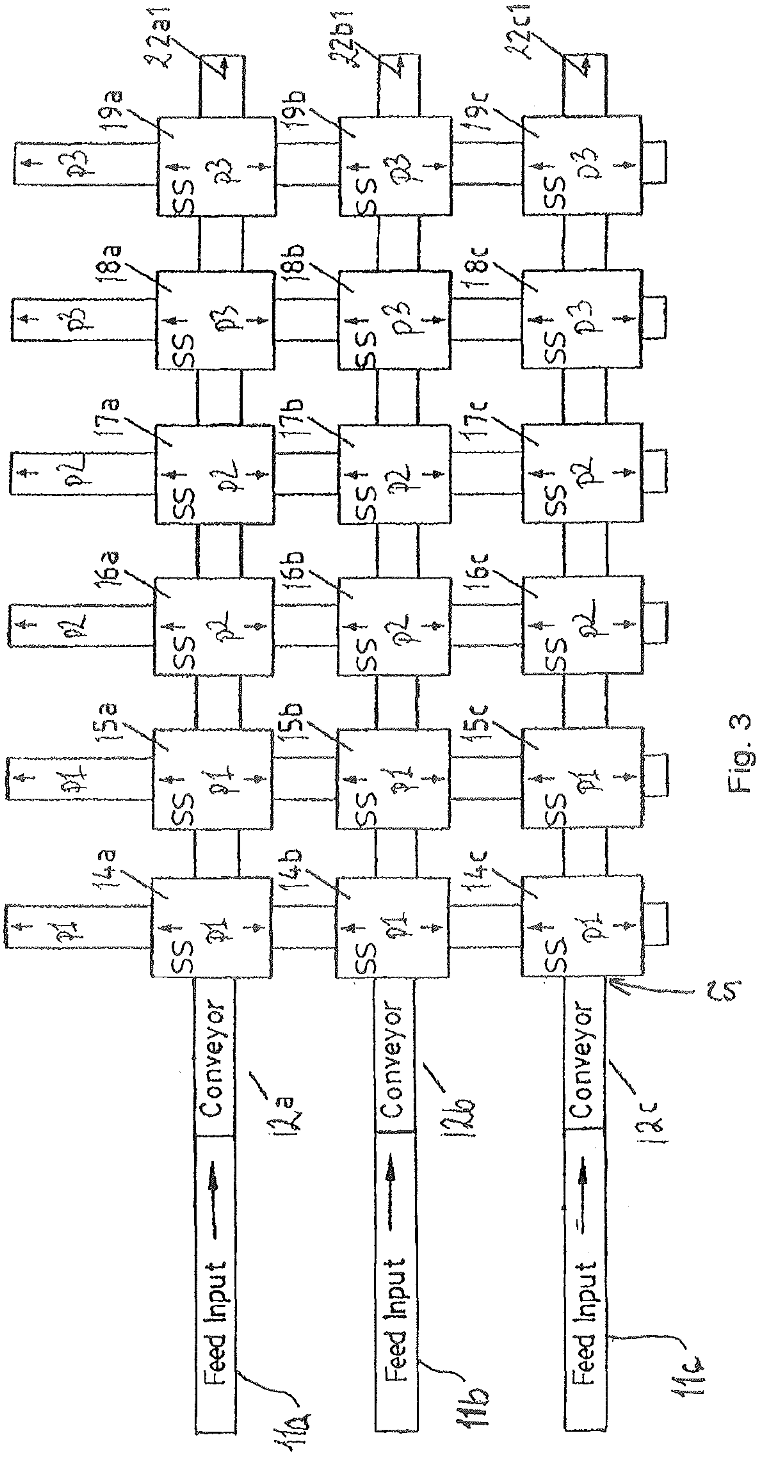
FIG. 3 is a schematic plan view from above showing one embodiment of an arrangement for sorting waste containers.

Also the sorting means can be arbitrarily designed. FIG. 3 illustrates one sorting arrangement for the sorting of three different randomly distributed fractions of waste containers. The waste containers are feed to the arrangement by three parallel feed inputs 11*a*, 11*b*, 11*c*. Through the feed inputs the randomly distributed waste containers are transported along three parallel conveyors 12*a*, 12*b*, 12*c*, with a certain interval between the individual waste containers, in order for the waste containers to be sorted at sorting stations 14*a-c*, 15*a-c*, 16*a-c*, 17*a-c*, 18*a-c*, 19*a-c* that are arranged in series one after the other. The individual waste containers may all be provided with specific patterns p1, p2, p3 to be detected by corresponding sensors at the sorting stations. The containers provided with the first pattern p1 are identified and separated at the first two sorting stations 14*a-c*, 15*a-c*, the containers provided with the second pattern p2 are sorted at the two following sorting stations 16*a-c*, 17*a-c*, and the containers provided with the third pattern p3, alternatively no pattern or alternatively all patterns at all, i.e. "other waste", are sorted at the two last sorting stations 18*a-c*, 19*a-c*. Separation of containers identifiable by the same pattern at multiple succeeding sorting stations in this way increases the capacity but also the accuracy of the sorting. This arrangement may also be constructed in a number of different ways, e.g. such as those disclosed in EP 1 583 618 B1. It is also possible to combine sorting based on pattern as disclosed in the present application with the color coded sorting disclosed in EP 1 583 618 B1.

According to one alternative embodiment each sorting stations may be provided with a auxiliary sensor, the possible location of which is denoted 25 in FIGS. 2 and 3, this sensor may be provided for each of the sorting stations or only for some of them. This auxiliary sensor may be arranged to detect if there is an object on the conveyor belt, for instance passing through a light beam emitted by the sensor, i.e. a photocell sensor. The auxiliary sensor may thus provide the sorting station, and/or the first sensor, with a signal when an object passes the sensor, i.e. that there is an object on the conveyor belt of which an image should be captured. The auxiliary sensor may thus be any conventional motion detecting sensor known to the skilled person. The second senor may be arranged at the input side of the sorting station, and at a height above the plane of the conveyor belt, i.e. such that it is able to detect objects, e.g. containers filled with waste, conveyed on the conveyor belt. This allows for an even better sorting and removal of containers from the conveyor.

The invention claimed is:

1. A method for identifying and sorting randomly distributed waste containers transported on a conveyor, said waste containers consisting of a thin-walled bag of flexible material containing different types of refuse sorted at source, wherein the identification is based on an image analysis by an optical camera of a pattern arranged on each container, the method for identifying and sorting comprising the following steps:

capturing, by at least an optical camera, at least one image of each container;

analyzing the image, by a computer, by determining the following characteristics:

a shade and/or color of the pattern; and a type of the pattern arranged on the container by determining a shape factor;

calculating a sorting value based on the determined characteristics;

comparing the calculated sorting value to a predetermined limit value or predetermined range of sorting values in order to classify the type of refuse contained in the container for sorting thereof, and sorting by selectively striking or pushing a waste container away from the conveyor belt.

2. The method as claimed in claim 1, wherein the pattern comprises at least one well-defined object.

3. The method as claimed in claim 1, wherein the pattern comprises a plurality of well-defined objects, and wherein the plurality of well-defined objects form a cluster.

4. The method as claimed in claim 3, further comprising analyzing the image by determining the following characteristics:

the number of the plurality of well-defined objects within the cluster;

distances between the plurality of well-defined objects of the cluster; and a size of each individual well-defined object.

5. The method as claimed in claim 1, further comprising analyzing the image by determining a surface area of the pattern.

6. The method as claimed in claim 1, wherein the container is provided with a color, and wherein the color of the container is different from the color of the pattern.

7. The method as claimed in claim 1, wherein the pattern is arranged on at least one well-defined portion of the container.

8. The method as claimed in claim 1, wherein the pattern is arranged on a plurality of locations on the container.

9. The method as claimed in claim 1, wherein the pattern comprises two or more different colors.

10. A system for sorting a plurality of waste containers consisting of thin-walled flexible plastic bags containing a quantity of waste, wherein the containers are provided with at least one well-defined pattern, the system comprising:

a conveyor arranged to transport the waste containers, at least one first sensor arranged for analysing a pattern arranged on a container, and arranged to emit a signal when a waste container transported on the conveyor is recorded by the at least one first sensor, wherein the sensor is an optical camera for capturing at least one image of each waster container passing by the sensor, and equipment for removing the waste container from said conveyor based on the signal from the at least one first sensor, wherein the at least one first sensor is arranged to analyze the pattern arranged on the waste containers according to the method in claim 1.

11. The system as claimed in claim 10, further comprising at least one second sensor for analyzing a pattern of a waste container according to the method in claim 1, and for emitting a second signal in response to the at least one second sensor recording the pattern on the waste container provided with said pattern transported on the conveyor, wherein the pattern analysed by the at least one second sensor may be the same as or different from the pattern analysed by the at least one first sensor, and wherein said equipment for removing the waste container from said conveyor is arranged to sort the waste containers based also on said second signal.

12. The system as claimed in claim 10, wherein the system further comprises an auxiliary sensor arranged to detect an object conveyed on the conveyor, wherein said auxiliary sensor is a motion detecting sensor.

13. A system for the sorting of waste containers, the system comprising conveyor arranged to transport randomly distributed waste containers containing different types of waste sorted at source, each waste container consisting of a thin-walled flexible plastic bags containing waste and having a predetermined pattern for the type of waste in the container, a number of successively arranged sorting stations, each station comprising at least one sensor selectively sensitive to the respective patterns and designed to emit a signal when a waste container passes which has a pattern predetermined for the at least one sensor and to which the at least one sensor is sensitive, wherein the sensor is an optical camera for capturing at least one image of each waste container passing by the sensor, and equipment for removing the waste container from said conveyor in response to a signal from the at least one sensor, wherein at least one sensor is sensitive to at least one further predetermined pattern on waste containers containing another type of waste, the at least one sensor arranged to analyze the pattern provided on the containers according to the method as claimed in any one of claims 1-9.

14. A method for identifying and sorting randomly distributed waste containers transported on a conveyor, said waste containers consisting of thin-walled bags of flexible materials containing different types of refuse sorted at source, and wherein the identification is based on an image analysis of a pattern, by an optical camera wherein the pattern comprises at least one well-defined object, the method for identifying and sorting comprising the following steps:

capturing at least one image of each container, by an optical camera;

analyzing, by a computer, the image by determining following characteristics:

a shade and/or color of the at least one well-defined object;

a size of the at least one well-defined object; and a surface area of the pattern; and a type of the pattern arranged on the container by determining a shape factor;

calculating a sorting value based on the determined characteristics; and comparing the calculated sorting value to a predetermined limit value or predetermined range of sorting values in order to classify the type of refuse contained in the container for sorting thereof, and sorting by selectively striking or pushing a waste container away from the conveyor belt.

15. The method as claimed in claim 14, wherein the pattern comprises a plurality of well-defined objects, and wherein the plurality of well-defined objects form a cluster arranged on each container.

16. The method as claimed in claim 15, wherein the method further comprises determining the following characteristic the distances between the plurality of well-defined objects.

* * * * *